United States Patent [19]

Obrist

[11] Patent Number: 5,374,231
[45] Date of Patent: Dec. 20, 1994

[54] AUTOMATICALLY OPERABLE MANUFACTURING AND MACHINING PLANT

[75] Inventor: Basil Obrist, Gontenschwil, Switzerland

[73] Assignee: Erowa AG, Reinach, Switzerland

[21] Appl. No.: 809,017

[22] Filed: Dec. 17, 1991

[30] Foreign Application Priority Data

Dec. 18, 1990 [CH] Switzerland ............ 4002/90-9
Nov. 21, 1991 [CH] Switzerland ............ 3409/91-8

[51] Int. Cl.$^5$ .................. B23Q 3/155; B23Q 5/22; B23P 23/00
[52] U.S. Cl. .................................. 483/15; 29/33 P; 364/474.21; 483/4
[58] Field of Search ............... 483/4, 7, 14, 15, 8, 483/9, 11; 29/33 P, 563; 364/474.21, 474.11

[56] References Cited

U.S. PATENT DOCUMENTS

| | | | |
|---|---|---|---|
| 4,288,849 | 9/1981 | Yoshida | 364/474.11 X |
| 4,621,410 | 11/1986 | Williamson | 29/563 X |
| 4,646,245 | 2/1987 | Prodel et al. | 364/478 X |
| 4,711,016 | 12/1987 | Genschon et al. | 29/563 X |
| 4,714,995 | 12/1987 | Materna et al. | 483/4 X |
| 4,821,198 | 4/1989 | Takeuchi et al. | 483/4 X |
| 4,991,706 | 2/1991 | Kitamura | 29/33 P |
| 5,046,021 | 9/1991 | Salvagnini | 483/14 X |
| 5,197,172 | 3/1993 | Takagi et al. | 29/33 P |

FOREIGN PATENT DOCUMENTS

| | | | |
|---|---|---|---|
| 364138 | 4/1990 | European Pat. Off. | 483/15 |
| 143945 | 8/1983 | Japan | 29/33 P |
| 76258 | 4/1986 | Japan | 29/33 P |
| 5084631 | 4/1993 | Japan | 483/4 |

*Primary Examiner*—William Briggs
*Attorney, Agent, or Firm*—Tarolli, Sundheim & Covell

[57] ABSTRACT

The invention provides an automatically operable manufacturing and machining plant. It comprises a plurality of machining cells, a management system for the workpieces including storage appliances for storing the workpieces, transporting appliances for transporting the workpieces and handling appliances for manipulating the workpieces, and a data handling and exchange system for controlling the operations of the manufacturing and machining plant. The data handling and exchange system comprises a first external data handling and exchange network with a central data processing unit for the exchange of operation control data between the central data processing unit and the machining cells and for the exchange of transporting control data between the central processing unit and the transporting appliances. Further, there is provided a second internal data handling and exchange network for the exchange of data between the storage appliances, the transporting appliances and the handling appliances. The workpieces are mounted on pallets which comprise memory modules containing data for the identification of the workpiece, destination data for the transport of the workpieces, and data for fetching machine programs used for the machining of the workpiece. The data contained in the memory modules are processed by the second internal data handling and exchange network.

15 Claims, 2 Drawing Sheets

AUTOMATICALLY OPERABLE MANUFACTURING AND MACHINING PLANT

BACKGROUND OF THE INVENTION

The present invention refers to an automatically operable manufacturing and machining plant, comprising a plurality of machining cells, a management system for workpieces to be machined including storage appliances for storing the workpieces to be machined and the finished workpieces, transporting appliances for transporting the workpieces to be machined and the finished workpieces and handling appliances for manipulating the workpieces to be machined and the finished workpieces, and a data handling and exchange system adapted to control the operations of the manufacturing and machining plant.

Particularly, the present invention refers to an automatically operable manufacturing and machining plant, comprising a plurality of numerically controlled machining tools, a plurality of control units whereby each of the control units is assigned to one of the machining tools, a plurality of tools for the machining of workpieces, a plurality of storage appliances adapted to receive the tools and workpieces, a plurality of handling apparatusses for feeding workpieces to the machining tools and for exchanging the tools of the machining tools, whereby each of the handling apparatusses is assigned to one of the machining tools, and at least one measuring and aligning station adapted to prealign the workpieces and tools, respectively, and to examine the condition of the workpieces and tools, respectively.

OBJECTS OF THE INVENTION

It is an object of the present invention to provide an automatically operable manufacturing and machining plant having an efficient system for the flow of information and data required to control and supervise the machining and manufacturing of workpieces.

It is a further object of the invention to provide an automatically operable manufacturing and machining plant which is suitable for manufacturing and machining of a great number of different workpieces in comparatively small amounts in a simple and efficient manner.

It is a still further object of the invention to provide an automatically operable manufacturing and machining plant which has an improved system for the identification of the workpieces and the handling of data required for the manufacturing or machining of a certain workpiece.

It is a still further object of the invention to provide an automatically operable manufacturing and machining plant which has an improved information system for the transfer of data in connection with the manufacturing or machining operations.

SUMMARY OF THE INVENTION

According to a first aspect, the invention provides an automatically operable manufacturing and machining plant comprising a plurality of machining cells, a management system for workpieces to be machined and a data handling and exchange system adapted to control the operations of the manufacturing and machining plant.

The management system comprises storage appliances for storing the workpieces to be machined and the finished workpieces, transporting appliances for transporting the workpieces to be machined and the finished workpieces, and handling appliances for manipulating the workpieces to be machined and the finished workpieces.

The data handling and exchange system comprises a first external data handling and exchange network with a central data processing unit for the exchange of operation control data between the central data processing unit and the machining cells and for the exchange of transportation control data between the central processing unit and the transporting appliances.

Further, there is provided a second internal data handling and exchange network for exchanging data between the storage appliances, the transporting appliances and the handling appliances.

Memory modules are fixedly assigned to the workpieces to be machined and contain data for the identification of the workpiece to be machined, destination data for the transport of the workpieces to be machined, and data for fetching machine programs used for the machining of the workpiece to be machined whereby the data contained in the memory modules are processed by the aforementioned second internal data handling and exchange network.

Preferably, the machining and manufacturing plant according to the invention is provided with a plurality of uniform interfaces each assigned to one of the machining cells. These interfaces are adapted to translate differing data protocolls and are connected to the first external data handling and exchange network as well as to the second internal data handling and exchange network.

Thus, with the provisions according to the invention, the data compound in the entire information network of the machining and manufacturing plant can be tied together without a gap.

In a further embodiment, the manufacturing and machining plant of the invention comprises the following elements and components:

- a plurality of numerically controlled machining tools;
- a plurality of control units, each assigned to one of the machining tools;
- a plurality of tools for the machining of workpieces;
- a plurality of storage appliances adapted to receive the tools and workpieces;
- a plurality of handling appliances for feeding workpieces to the machining tools and for exchanging the tools of the machining tools, whereby each of the handling appliances is assigned to one of the machining tools;
- at least one measuring and aligning station adapted to prealign the workpieces and tools, respectively, and to examine the condition of the workpieces and tools, respectively;
- a plurality of uniformly designed pallets on which the workpieces and tools to be used in the machining tools are mounted individually or in groups.

Preferably, the pallets comprise positioning means which serve to fix the pallets in the machining tools in an exactly predetermined position. Thereby, the workpieces remain mounted on the pallet on their way through the manufacturing and machining plant until they are fully finished.

The pallets with workpieces mounted thereon and the pallets with tools mounted thereon are equipped with electronic data memory modules in which data for the identification of the workpieces and tools, respectively, and data for the control of the automatically operating machining are stored.

The handling appliances and the measuring station comprise data processors including reading heads for reading the data stored in the memory modules, and the data processors are communicatively connected to the aforementioned control means assigned to the machining tools.

According to a further aspect, the invention provides an automatically operable manufacturing and machining plant, comprising a plurality of machining stations each containing at least one numerically controlled machining tool, a plurality of pallets adapted to receive workpieces to be machined or tools for the machining of the workpieces, a set-up station for loading workpieces or tools on the pallets, a plurality of transportable magazines adapted to receive the pallets loaded with the workpieces or tools, a transfer station for loading pallets into the transportable magazines and for unloading pallets from the transportable magazines, a storing station for the transportable magazines loaded with the pallets, and an automatically operating transporting appliance for transporting the magazines loaded with the pallets on a traffic network interconnecting the aforementioned machining stations, the aforementioned set-up station, the aforementioned transfer station and the aforementioned storing station.

In such an automatically operable manufacturing and machining plant, each of the machining stations comprises a handling apparatus for transferring the pallets loaded with the workpieces or tools between the magazines and the machining tool, and each of the machining tools comprises a control unit incorporating a first memory for storing a plurality of machining programs.

Further, there is provided a first external data handling and exchange network with a central data processing unit. The first network is adapted to exchange operation control data between the central data processing unit and the control units assigned to the machining tools.

Each of the pallets comprises a memory module in which data for the identification of the workpiece or tools mounted on the related pallet and data for the machining of the workpiece mounted on the related pallet are stored.

In addition, each of the transportable magazines comprises also a memory module in which data for the identification of the content of the magazines and data for the transport of the magazines are stored.

A second internal data handling and exchange network is provided for exchanging data between the memory modules provided on the pallets and the memory modules provided on the transportable magazines on the one side and the machining stations, the set-up station, the transfer station, the storing station and the automatically operating transporting appliances on the other side.

Finally, a uniform interface is provided in each of the machining stations for interconnecting the aforementioned handling appliances and the control unit of the machining tool. The interface comprises a translator for translating the data protocol of the second internal data exchange and handling network into the data protocol of the control unit of the assigned machining tool.

The use of workpiece and tool pallets incorporating uniform mechanical positioning means forms a good basis for the application of the identification system according to the invention. Thereby, particularly as far as the workpiece pallets are concerned, the pallets can be adapted either to receive only one individual workpiece or to receive a group of identical workpieces.

In contrary to the identification systems known in the prior art which operate with regard to the position of the workpieces and tools on the basis of a location code system, the identification system according to the invention allows the reliable identification of the workpieces and tools themselves. This fact not only substantially increases the safety against inadvertent confusions of the relation of the data and the workpieces and tools, respectively, but renders possible a disordered storage of the workpieces and tools in the magazines.

The reliable identification of the components (workpieces and/or tools) is the basis that the individual components can be provided with additional informations, particularly informative data representative for the transport destination position of the workpiece and/or tool and data representative for the fetching of machining programs required for the machining of the individual workpiece. Only workpiece pallets and tool pallets carrying such data with them and being in a position to transmit these data to related control units render possible a fully automatic operation of a manufacturing and machining plant incorporating a plurality of individual manufacturing and/or machining cells.

A particular advantage of the identification system according to the invention is that it is not necessary to store the machining data in the form of more or less complete control or machining programs for the machining tools required for the corresponding operation in their entirety in the memory modules of the pallets. In contrary, only data for the identification of the required control or machining program has to be stored in the memory modules of the pallets in order to call for the suitable control or machining program which is stored in a stationary memory of the control unit of the related machining tool as soon as a pallet is to be inserted into the machining tool. The result is that the size or volume of the data memory modules on the pallets can be quite small.

A particularly advantageous embodiment of the manufacturing and machining plant according to the invention can be realized if the machining stations, the storing station, the transport vehicles and the transfer station each comprise uniform receiving means adapted to receive the transportable magazines. Thereby, the receiving means each incorporate a data processing unit with a data reading head for reading the data stored in the memory modules provided on the transportable magazines. These data, in particular, include data representing a timetable for the pallet magazine informing about the location of the machining stations to which the pallet has to be transported and the order in which these machining stations have to be served.

As soon as a pallet magazine has been transferred to a transport vehicle, the next transport destination can be seen from the data contained in the memory module of the related pallet magazine. This information is sent to the control unit for the transport system which ensures that the related transport vehicle loaded with a certain pallet magazine is led to a certain machining station identified by the data contained in the memory module of the pallet. As the transport system is always informed about the next transport destination position, it is no longer necessary to store complete transport programs in the transport control unit. The result is that the control of the material transportation becomes much more simple, flexible and efficient.

The data handling and exchange system according to the invention further renders possible to take measures for an alteration of the transport timetable in a simple and efficient way, e.g. in the case when a certain destination position is already occupied or out of operation and, thus, cannot be approached. Such measures can be limited to a data exchange in the internal data handling and exchange network and do not require an alteration of the program of the central processing unit. A pallet magazine which cannot reach its predetermined destination can be deviated to the storage appliance where it temporarily stays. Therefrom, it can be called at a later time upon the occurrence of a data signal which represents the fact that the previously occupied or inoperative destination is now free or in operation again.

Preferably, the pallets and the pallet magazines comprise electronic read and write data memory modules ensuring that the data contained in the electronic data memory modules can be changed during the manufacturing or machining process, e.g. for the modification of the data to adapt them to the actual state of machining. For this purpose, the data processing units in the handling appliances and the measuring station further comprises a writing head as well as a control and analyzing unit for controlling the reading and writing process of the memory modules.

An important prerequisite for a troublefree operation of the manufacturing and machining plant according to the invention is the safety of the data exchange. Considering the often rough conditions in the region of the machining cells with the disturbing influences of heat, oil, metal chips and cooling fluids, it is advantageous to use a system for the data exchange with touchless operation, preferably a wireless carrier frequency data exchange system.

As far as the power supply of the memory modules is concerned, it is advantageous to use non-powered memory modules whereby a system is provided for the wireless supply of power, which is required for the exchange of data between the data processing units and the memory modules, to the memory modules. Semiconductor memory modules of this kind are not expensive, relatively small and can be mounted in nearly any desired position. Preferably, an electric alternating current field is used for the transmission of energy to the electronic memory modules.

BRIEF DESCRIPTION OF THE DRAWINGS

In the following, a preferred embodiment of the invention will be further described, with reference to the accompanying drawings, in which.

DETAILED DESCRIPTION OF A PREFERRED EMBODIMENT

Figure 1:
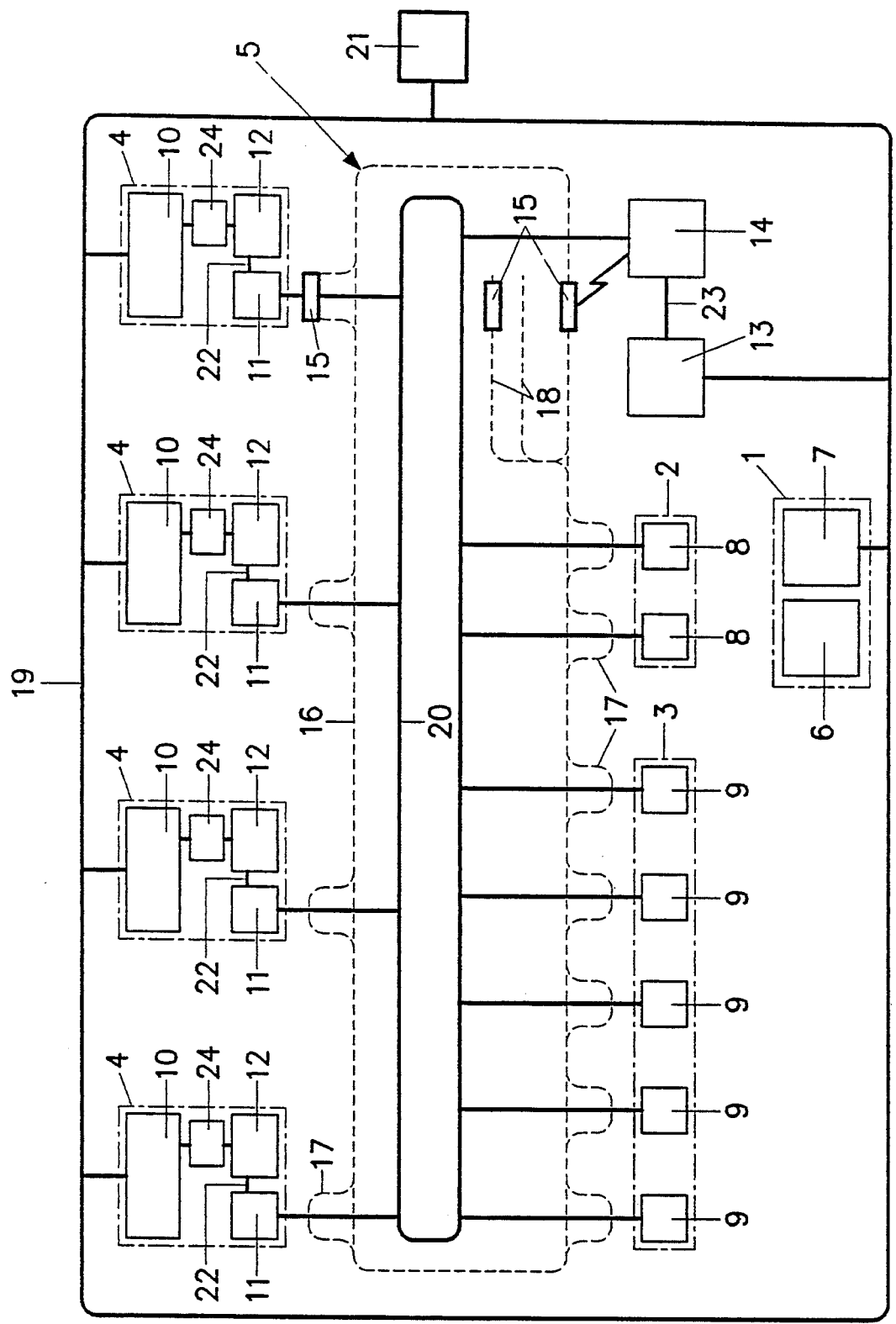
FIG. 1 schematically shows the overall general layout of an automatically operable manufacturing and machining plant according to the invention.

The automatically operable manufacturing and machining plant schematically shown in FIG. 1 comprises, for example, a set-up station 1 in which uniform pallets (not shown) are loaded with either workpieces to be machined or with tools used for the machining of the workpieces. Further, there is provided a transfer station 2 in which transportable pallet magazines (not shown) are loaded with pallets having workpieces or tools mounted thereon and in which pallets having workpieces or tools mounted thereon are unloaded from the transportable pallet magazines. The machining and manufacturing plant shown in FIG. 1 further comprises a storing station 3 in which pallet magazines which are still empty or which are loaded with pallets having workpieces or tools mounted thereon are stored. Still further, in this example, four machining stations 4 are provided in which the workpieces are machined, and a traffic network 5 interconnecting the transfer station 2, the storing station 3 and the four machining stations 4.

The set-up station 1 includes a mounting station 6 in which the workpieces and the tools are mounted on standardized and uniform pallets, as well as a measuring station 7 in which the geometrical data of the workpieces and tools mounted on the pallets are determined.

In the transfer station which comprises two bins 8 each for one pallet magazine, on the one side, arriving pallet magazines having pallets with finally machined workpieces are unloaded and, on the other side, still empty pallet magazines are loaded with pallets having workpieces to be machined or tools mounted thereon.

The storing station 3 comprises a plurality of storage bins, in the present example five storage bins 9, in which empty and/or loaded pallet magazines are temporarily stored.

In the present example, each of the machining stations 4 comprises a machining tool 10, usually in the form of a numerically controlled machining apparatus, a bin 11 for a pallet magazine and a handling and manipulating apparatus 12 for removing pallets loaded with workpieces from the pallet magazine in the storage bin 11 and for inserting the machined workpieces including their associated pallets into the machining apparatus, and vice versa, and for inserting and removing tools into and from, respectively, the machining apparatus.

The traffic network 5 is part of an automatically operated transporting installation which comprises a central transport control station 13, a remote control system 14 and a plurality of remote-controlled vehicles 15 which are disposable at the moment when they are required. In particular, the traffic network consists of a number of different, preferably railless tracks along which the vehicles 15 are guided, whereby there is provided a closed loop main track 16 running along the transfer station 2, the storing station 3 and the four machining stations 4, as well as a number of separate track loops 17 running to each storage 8, 9 and 11. Thus, several vehicles 15 can circulate on the traffic network simultaneously without hindering each other. Further, a number of parking tracks 18 is provided for vehicles 15 not in use.

The information handling and exchange system comprises two separate data networks, namely a first external data handling and exchange network 19 and a second data handling and exchange network 20. The first external data handling and exchange network 19 interconnects the control units of the numerically controlled machining tools 10 of each machining station 4 and the transport control station 13 with a central operational data processor 21 and is provided for the handling and exchange of operational control data between the operational data processor 21 and the control units of the numerically controlled machining tools 10, and for the handling and exchange of transport control data between the operational data processor 21 and the transport control station 12. The first external data handling and exchange network 19 can be part of a data processing system known under the trade name "ETHERNET" to which can be connected, besides the operational data processor 21, e.g. a operational planning system.

The second internal data handling and exchange network 20 interconnects the divisions of the machining and manufacturing plant which are part of the material transportation and storage systems, i.e. the storing station 2, the handling apparatusses 12 and the vehicles 15. Particularly, all storage bins 8 of the transfer station, all storage bins 9 of the storage station 3 and the storage bins 11 of the machining stations 10 as well as the remote control system 14 for controlling the vehicles 15 are interconnected to each other by means of said second internal data handling and exchange network 20. For the exchange of data between the bins for the pallet magazines 11 and the handling devices 12 of the machining stations 4 on the one side and between the transport control station 13 and the remote control system 14 on the other side, there are provided data lines 22 and 23, respectively. Furthermore, in each machining station 4, the handling apparatus 12 is connected with the control unit of the machining tool 10 via an interface 24 which includes a translating circuit for the translation of the data protocol of the internal data network 20 into the data protocol of the control unit of the related machining tool 10 whereby the control unit of the machining tool 10 is connected to the external data handling and exchange network 19.

To the material to be handled, i.e. to the pallets loaded with workpieces and tools, respectively, and to the pallet magazines, certain data are fixedly related. These data comprise data for the identification of the material, destination data for the transport of the material and data for fetching machine programs used for machining the material. These data are exchanged by means of the internal data network 20. For this purpose, all pallets and all pallet magazines each comprise an electronic memory module in which the data belonging to the material on the pallet and to the material contained in the pallet magazine, respectively, are stored. In all places where the pallets rest and in all transfer locations of the pallets, data processing units are provided which are equipped with a data read head in order to read the data stored in the electronic memory modules. The handling apparatusses 12 and the measuring station 7 are equipped with data processing units which further comprise a data write head in order to write data into the electronic memory modules, e.g. data representative for the actual state of machining.

Figure 2:
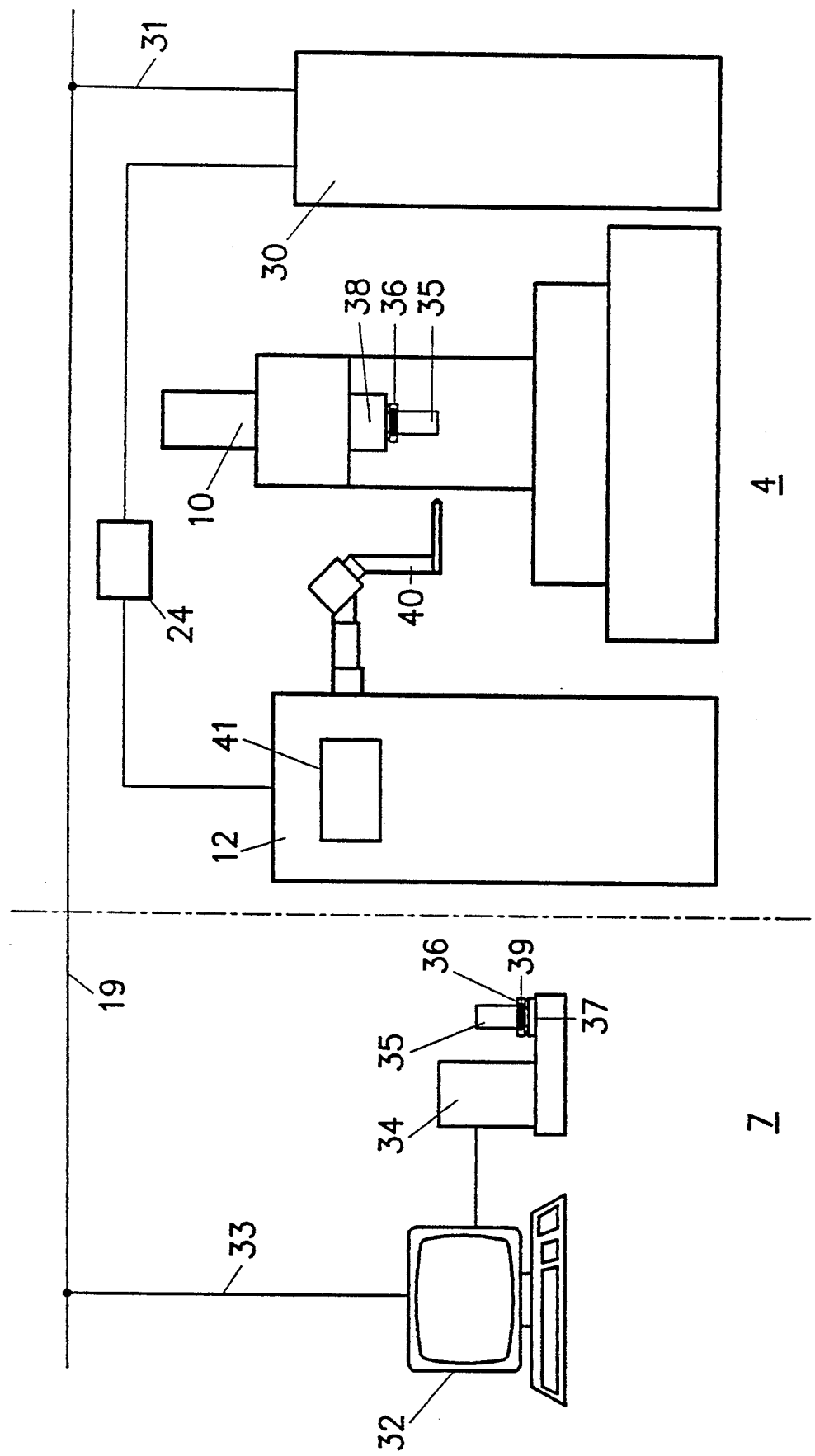
FIG. 2 shows a schematic diagram of the essential details of a machining station and of a measuring station.

In FIG. 2, there is shown a machining station 4 (without the bin 11 for the pallet magazine) and the measuring station 7 which is part of the set-up station 1 in more detail. Corresponding parts and elements are provided with the same reference numeral as in FIG. 1.

The machining tool 10 comprises a control unit 30 which is connected to the external data network 19 via a data line 31 and connected to the handling apparatus 12 via a data line 24. The control unit 30 is equipped with a data memory in which a plurality of machining programs is stored. The machining program serves to control the machining of a workpiece by means of the machining tool 10.

The measuring station comprises a computer terminal 32 which is connected to the external data network 19 via a data line 33. A measuring device 34 for determining the geometrical data of a workpiece is connected to the computer terminal 32.

The workpiece 35 is mounted on one out of a plurality of pallets 36 which are uniformly designed as far as their positioning means are concerned. Thus, the pallet 36 can be fixed in an exactly predetermined position in all locations where the workpiece 35 will have to stay to be stored, measured or machined, e.g. on a support 37 of the measuring device 34 or at the clamping member 38 of the machining tool 10. The pallet 36 is provided with an electronic data memory module 39 in which are stored the data required for the identification, for the transportation and for the machining of the workpiece 35.

On the basis of an incoming machining order, the suitable workpiece 35 is fixed to a pallet 36 and all required data which are specified in the order (e.g. name and number of the workpiece, NC-machining program identification etc.) are written into the memory module 39 of the pallet 36 in the set-up station 1. Then, the pallet 36 with the workpiece 35 is transported to the measuring station 7 where its position on the top of the pallet 36 is measured and adjusted. Particularly, the actual position of the workpiece 35 on the pallet and the deviation from a predetermined reference position is measured with the help of the measuring device 34, and the measured data are stored in the memory module 39 of the pallet 36, together with the data relating to the order number, the part number of the workpiece and other required data. Thereby, all these data are fixedly related to a certain identifiable workpiece with the result that inadvertent confusions are avoided.

Thereafter, the thus prepared pallet 36 is transported to the transfer station 2 (FIG. 1) where it is loaded into a certain pallet magazine. At this place, also the data memory module of the pallet magazine is loaded with the required data which serve for the identification of the content of the pallet magazine and which also contain transportation data. A vehicle 15 takes the loaded pallet magazine over and transports it either directly to a machining station 4 or temporarily to a storing station 3.

At the beginning of a machining program, the pallet magazine filled with loaded pallets is displaced to the magazine receiving place provided for this purpose in the machining station 4. The location of the magazine receiving place is such that the pallet magazine is in the range of a movable gripper arm 40 of the handling apparatus 12. The handling apparatus 12 is provided with a data processing unit 41 equipped with a data read head which preferably is located at the end of the movable gripper arm 40.

In an initial phase, the data read head of the data processing unit 41 is moved along all positions in the pallet magazine where loaded pallets are stored, reads the data contained in the memory modules 39 of the pallets 36 and stores these data in the memory of the data processing unit 41. The control unit 30 is connected to the handling apparatus 12 and can directly call for the identification of a certain workpiece 35 stored in the pallet magazine. Thereafter, the handling apparatus 12 removes the required workpiece 35 from the pallet magazine and inserts it, together with the related pallet 36, into the machining tool 10. The data processing unit 41 related to the handling apparatus 12 reads the data stored in the memory module 39 of the pallet 36 during the transfer of the workpiece from the pallet magazine to the machining tool 10 and forwards these data to the control unit 30. As these data also contain the machining program identification required for the machining of the related workpiece 35, the control unit 30 selects the machining program required for the machining of the related workpiece from the collection of machining programs contained in its memory and uses the selected machining program to control the machining tool 10.

The tools required for the machining of the workpieces 35 can be handled basically in the same way as hereinbefore described.

After termination of the machining process, the workpiece 35 is brought back into the pallet magazine and another workpiece is removed from the pallet magazine to be machined according to its data contained in its memory module 39. When all the workpieces contained in a pallet magazine are machined, the pallet magazine can be transported to a further machining station for further machining of the workpieces contained in this pallet magazine, or it can be temporarily stored in one of the storage bins 9 of the storing station 3. Another possibility is to bring the pallet magazine back to the measuring station 7 or to another (not shown) measuring station where all workpieces 35 are measured again. If required, the new measuring data can be stored in the memory modules 39 provided on its pallet 36 and related to each workpiece 35. Further, it is still possible to store additional data in the memory modules 39, e.g. for the further machining, processing or handling of the workpiece 35.

What we claim is:

1. An automatically operable manufacturing and machining plant, comprising:
   a plurality of machining cells;
   a management system for workpieces to be machined;
   a data handling and exchange system adapted to control the operations of the manufacturing and machining plant;
   said management system comprising storage means for storing the workpieces to be machined and the finished workpieces, transporting means for transporting the workpieces to be machined and the finished workpieces, and handling means for manipulating the workpieces to be machined and the finished workpieces;
   said transporting means comprising a transporting control means;
   said data handling and exchange system comprising a first external data handling and exchange network with a central data processing unit, said first network being adapted to exchange operation control data between said central data processing unit and said machining cells and to exchange transporting control data between said central processing unit and said transporting control means;
   said data handling and exchange system further comprising a second internal data handling and exchange network for exchanging data between said storage means, said transporting means and said handling means; and
   memory means fixedly assigned to the workpieces to be machined, said memory means containing data for the identification of the workpiece to be machined, destination data for the transport of the workpieces to be machined, and data for fetching machine programs used for the machining of the workpiece to be machined;
   said data contained in said memory means being processed by said second internal data handling and exchange network.

2. An automatically operable manufacturing and machining plant, comprising:
   a plurality of numerically controlled machining tools;
   a plurality of control units, each of said control units being assigned to one of said machining tools;
   a plurality of tool means for the machining of workpieces;
   a plurality of storage means adapted to receive said tool means and said workpieces;
   a plurality of handling means for feeding workpieces to said machining tools and for exchanging the tool means of said machining tools, each of said handling means being assigned to one of said machining tools;
   at least one measuring and aligning station adapted to prealign the workpieces and tool means, respectively, and to examine the condition of the workpieces and tool means, respectively;
   a plurality of uniformly designed pallet means on which said workpieces and said tool means to be used in said machining tools are mounted individually or in groups, said pallet means comprising positioning means which serve to fix said pallet means in said machining tools in an exactly predetermined position, said workpieces remaining mounted on said pallet means on their way through the manufacturing and machining plant until they are fully finished;
   said pallet means with workpieces mounted thereon and said pallet means with tool means mounted thereon comprising electronic data memory means in which data for the identification of the workpieces and tool means, respectively, and data for the control of the automatically operating machining are stored;
   said handling means and said measuring and aligning station comprising data processing means including reading means for reading the data stored in said memory means, said data processing means being communicatively connected to said control means assigned to said machining tools.

3. An automatically operable manufacturing and machining plant, comprising:
   a plurality of machining stations each containing at least one numerically controlled machining tool;
   a plurality of pallet means adapted to receive workpieces to be machined or tool means for the machining of the workpieces;
   a set-up station for loading workpieces or tool means on said pallet means;
   a plurality of transportable magazine means adapted to receive said pallet means loaded with said workpieces or tool means;
   a transfer station for loading pallet means into said transportable magazine means and for unloading pallet means from said transportable magazine means;
   a storing station for said transportable magazine means loaded with said pallet means;
   an automatically operating transporting means for transporting said magazine means loaded with said pallet means on a traffic network interconnecting said machining stations, said set-up station, said transfer station and said storing station;

each of said machining stations comprising a handling means for transferring said pallet means loaded with said workpieces or tool means between said magazine means and said machining tool;

each of said machining tools comprising a control unit incorporating a first memory means for storing a plurality of machining programs;

a first external data handling and exchange network with a central data processing unit, said first network being adapted to exchange operation control data between said central data processing unit and said control units assigned to said machining tools;

each of said pallet means comprising a second memory means in which data for the identification of the workpiece or tool means mounted on said pallet means and data for the machining of said workpiece mounted on said pallet means are stored;

each of said transportable magazine means comprising a third memory means in which data for the identification of the content of said magazine means and data for the transport of said magazine means are stored;

a second internal data handling and exchange network for exchanging data between said second memory means provided on said pallet means and said third memory means provided on said transportable magazine means on the one side and said machining stations, said set-up station, said transfer station, said storing station and said automatically operating transporting means on the other side;

a uniform interface means provided in each of said machining stations for interconnecting said handling means and said control unit of said machining tool, said interface means comprising means for translating the data protocol of said second internal data exchange and handling network into the data protocol of said control unit of the assigned machining tool.

4. An automatically operable manufacturing and machining plant according to claim 1 in which there is provided a plurality of uniform interface means each assigned to one of said machining cells, said interface means comprising means for translating differing data protocolls and being connected to said first external data handling and exchange network as well as to said second internal data handling and exchange network.

5. An automatically operable manufacturing and machining plant according to claim 2 in which said electronic data memory means comprise read and write memory modules ensuring that the data contained in said electronic data memory means can be changed during the manufacturing or machining process.

6. An automatically operable manufacturing and machining plant according to claim 2 in which said data processing means in said handling means and said measuring station further comprises a writing means as well as a control and analyzing unit for controlling the reading and writing process of said memory means.

7. An automatically operable manufacturing and machining plant according to claim 2 in which there is provided a wireless carrier frequency system for exchanging data between said data processing means and said memory means.

8. An automatically operable manufacturing and machining plant according to claim 2 in which said memory means comprise non-powered memory modules and in which means are provided for the wireless supply of power, which is required for the exchange of data between said data processing means and said memory means, to said memory modules.

9. An automatically operable manufacturing and machining plant according to claim 8 in which an inductive alternating current field is provided for the transfer of power for said memory modules.

10. An automatically operable manufacturing and machining plant according to claim 3 in which said workpieces or said tool means are mounted on said pallet means individually or in groups, said pallet means comprising uniform positioning means which serve to fix said pallet means in said machining tools in an exactly predetermined position, said workpieces or tool means remaining mounted on said pallet means on their way through the manufacturing and machining plant until the workpieces are fully finished.

11. An automatically operable manufacturing and machining plant according to claim 3 in which said set-up station includes a measuring station connected to said first external data handling and exchange network for determining the geometrical data of the workpieces and tool means, respectively, mounted on said pallet means, and further includes a data processing unit incorporating data reading and writing means cooperating with said second memory means provided on said pallet means.

12. An automatically operable manufacturing and machining plant according to claim 3 in which said automatically operating transporting means comprises a plurality of transport vehicles and a central transport control station connected to said first external data handling and exchange network for controlling the movement of said vehicles.

13. An automatically operable manufacturing and machining plant according to claim 3 in which said machining stations, said storing station, said transport vehicles and said transfer station each comprise uniform receiving means adapted to receive said transportable magazine means, said receiving means each incorporating a data processing unit with a data reading means for reading the data stored in said third memory means provided on said transportable magazine means.

14. An automatically operable manufacturing and machining plant according to claim 3 in which each of said handling means comprises a data processing unit incorporating a data reading and writing means cooperating with said second memory means on said pallet means, said data processing unit comprising a uniform interface means with means for translating the data protocol of said second internal data handling and exchange network into the data protocol of said control unit of said machining tool assigned to said control unit.

15. An automatically operable manufacturing and machining plant, comprising:
a plurality of numerically controlled machining tools;
a plurality of control units, each of said control units being assigned to one of said machining tools;
a plurality of tool means for machining of workpieces;
a plurality of storage means adapted to receive said tool means and said workpieces;
transporting means for transporting said tool means and said workpieces, said transporting means comprising a transporting control means;
a plurality of handling means for feeding workpieces to said machining tools and for exchanging the tool means of said machining tools, each of said handling means being assigned to one of said machining tools;

at least one measuring and aligning station adapted to realign the workpieces and tool means, respectively, and to examine the condition of the workpieces and tool means, respectively;

a plurality of uniformly designed pallet means on which said workpieces and said tool means to be used in said machining tools are mounted individually or in groups, said pallet means comprising positioning means which serve to fix said pallet means in said machining tools in an exactly predetermined position, said workpieces remaining mounted on said pallet means on their way through the manufacturing and machining plant until they are fully finished;

said pallet means with workpieces mounted thereon and said pallet means with tool means mounted thereon comprising electronic data memory means in which data for the identification of the workpieces and tool means, respectively, destination data for the transport of the workpieces to be machined, data for fetching machine programs used for the machining of the workpiece to be machined, and data for the control of the automatically operating machining are stored;

a data handling and exchange system adapted to control the operations of the manufacturing and machining plant;

said data handling and exchange system comprising a first external data handling and exchange network with a central data processing unit, said first network being adapted to exchange operation control data between said central data processing unit and said plurality of control units and to exchange transporting control data between said central processing unit and said transporting control means;

said data handling and exchange system further comprising a second internal data handling and exchange network for exchanging data between said storage means, said transporting means and said handling means, said second internal data handling and exchange network processing data contained in said memory means; and said handling means and said measuring and aligning station comprising data processing means including reading means for reading data stored in said memory means, said data processing means being communicatively connected to said control units assigned to said machining tools.

* * * * *